US012640500B2

(12) United States Patent
Biswas et al.

(10) Patent No.: US 12,640,500 B2
(45) Date of Patent: May 26, 2026

(54) HIGH-GAIN, WIDE-ANGLE, MULTI-BEAM, MULTI-FREQUENCY BEAMFORMING LENS ANTENNA

(71) Applicant: Envistacom, LLC, Atlanta, GA (US)

(72) Inventors: Soumitra Biswas, Peachtree Corners, GA (US); Howard Jetmundsen, Peachtree Corners, GA (US); Shawn Rogers, Johns Creek, GA (US); Harold Thomas Cox, Suwanee, GA (US)

(73) Assignee: APOTHYM TECHNOLOGIES GROUP, LLC, Peachtree Corners, GA (US)

( * ) Notice: Subject to any disclaimer, the term of this patent is extended or adjusted under 35 U.S.C. 154(b) by 1442 days.

(21) Appl. No.: 17/103,667

(22) Filed: Nov. 24, 2020

(65) Prior Publication Data

US 2021/0159597 A1 May 27, 2021

Related U.S. Application Data

(60) Provisional application No. 63/062,371, filed on Aug. 6, 2020, provisional application No. 62/940,018, filed on Nov. 25, 2019.

(51) Int. Cl.
*H01Q 25/00* (2006.01)
*H01Q 5/25* (2015.01)
(Continued)

(52) U.S. Cl.
CPC ............. *H01Q 25/007* (2013.01); *H01Q 5/25* (2015.01); *H01Q 15/08* (2013.01); *H01Q 19/062* (2013.01)

(58) Field of Classification Search
CPC ........ H01Q 5/25; H01Q 15/08; H01Q 19/062; H01Q 25/007
See application file for complete search history.

(56) References Cited

U.S. PATENT DOCUMENTS 2,328,157 A 8/1943 Luneberg
6,590,544 B1 * 7/2003 Filipovic ............. H01Q 19/062 343/753

(Continued)

FOREIGN PATENT DOCUMENTS

CN 205122779 U 3/2016
CN 110098490 A 8/2019
WO 2018106731 A1 6/2018

OTHER PUBLICATIONS

S. Biswas and M. Mirotznik, "High gain, wide-angle QCTO-enabled modified Luneburg lens antenna with broadband anti-reflective layer," Scientific Reports, (2020), vol. 10, Art. No. 12646.

(Continued)

*Primary Examiner* — Dimary S Lopez Cruz
*Assistant Examiner* — Amal Patel
(74) *Attorney, Agent, or Firm* — McBee, Moore & Vanik IP, LLC

(57) ABSTRACT

A high-gain, wide-angle, multi-beam, multi-frequency beamforming lens antenna that includes a Luneburg lens with at least one planar interface in the southern hemisphere of the Luneburg lens and a planar ultrawideband modular antenna (PUMA array) structure. The PUMA array structure is connected to at least one of the planar interfaces of the Luneburg lens and is configured to function as a feed network to illuminate cells of the Luneburg lens simultaneously.

8 Claims, 17 Drawing Sheets

(51) Int. Cl.
*H01Q 15/08* (2006.01)
*H01Q 19/06* (2006.01)

(56) References Cited

U.S. PATENT DOCUMENTS

| | | | | |
|---|---|---|---|---|
| 2014/0139370 | A1* | 5/2014 | Hamner | G01S 13/4463 342/175 |
| 2018/0004095 | A1 | 1/2018 | Tukker et al. | |
| 2018/0183152 | A1 | 6/2018 | Turpin et al. | |
| 2018/0302802 | A1* | 10/2018 | Fanfelle | H04W 16/28 |
| 2020/0083610 | A1* | 3/2020 | Pance | H01Q 9/0485 |
| 2020/0119868 | A1* | 4/2020 | Rakib | H01Q 3/245 |

OTHER PUBLICATIONS

Soumitra Biswas, "Design and additive manufacturing of broadband beamforming lensed antennas and load bearing conformal antennas," Diss. University of Delaware, 2019.
Robert Foster, et al. "Beam-steering performance of flat Luneburg lens at 60 GHz for future wireless communications," International Journal of Antennas and Propagation, (2017), vol. 2017, 1-8.
Luneburg lens, Wikipedia, The Free Encyclopedia, https://en.wikipedia.org/w/index.php?title=Luneburg_lens&oldid=993514856 (last visited Dec. 18, 2020).
Soumitra Biswas, et al., "Realization of modified Luneburg lens antenna using quasi-conformal transformation optics and additive manufacturing," Microwave and Optical Technology Letters, (2019), vol. 61, No. 4: 1022-1029.
Steven S. Holland, et al., "A 7-21 GHZ dual-polarized planar ultrawideband modular antenna (PUMA) array," IEEE Transactions on Antennas and Propagation, (2012), vol. 60., No. 10 : 4589-4600.
International Search Report for Application No. PCT/US2020/62085 mailed Mar. 12, 2021.
Xiang Gu, et al., "DOA Estimation by Using Luneburg Lens Antenna with Mode Extraction and Signal Processing Technique, " Progress In Electromagnetics Research C, (2015), vol. 56, 145-151.
International Written Opinion for Application No. PCT/US2020/62085 mailed Mar. 12, 2021.
Biswas et al., "Quasi-Conformal Transformation Optics (QCTO) enabled modified Luneburg lens design using broadband anti-reflective layer," In Comsol Conference, 2019, 1-4.

* cited by examiner

HIGH-GAIN, WIDE-ANGLE, MULTI-BEAM, MULTI-FREQUENCY BEAMFORMING LENS ANTENNA

CROSS REFERENCE TO RELATED PATENT APPLICATIONS

This patent application claims priority to U.S. Provisional Patent Application No. 62/940,018, filed Nov. 25, 2019 and U.S. Provisional Patent Application No. 63/062,371, filed Aug. 6, 2020, the disclosures of each of which are herein incorporated in their entireties.

FIELD OF THE INVENTION

This disclosure relates to communications and radar antenna technology, and more particularly to broadband microwave lens antennas with relatively high gain and a wide-angle aperture and multiband microwave electronically steered lens antennas with relatively high gain and wide beamscanning angle.

BACKGROUND OF THE INVENTION

Satellite communications (SATCOM) and terrestrial microwave communications systems such as microwave line-of-sight, cellular, and tactical networking typically require the use of transmitter/receivers connected to directional antennas that aim the energy of a signal in either a general or specific direction towards another directional antenna connected to a transmitter/receiver. A common type of antenna used in both SATCOM and terrestrial communications is a parabolic reflector with a waveguide feed located at the focal point of the parabola. These antennas are highly effective in networks where both the antenna and the distant end antenna are stationary, such as in the case of a Geosynchronous Earth Orbit (GEO) satellite, or a microwave point-to-point link between two buildings or a building and a tower.

New satellite constellations that operate in Non-Geostationary Satellite Orbit (NGSO), specifically in Medium Earth Orbit (MEO) and Low Earth Orbit (LEO), as well as the increasingly ubiquitous implementation of terrestrial communications systems that require line-of-sight and non-line-of-sight beam-steering base stations with multiple beams of energy being radiated simultaneously are challenging the paradigm of single-beam, mechanically articulated parabolic reflector antennas. Several new and innovative solutions involving Electronically Steerable Array (ESA) antennas and, more specifically, Active ESA (AESA) antennas have been developed to address these new challenges. The value these terminals bring to the marketplace is their inherent ability to direct one or several energy beams in different directions without any moving parts, allowing installers to place an antenna in one position and have it connect to distant end antennas that are in motion, such as NGSO LEO and MEO communication satellites, and antennas attached to moving vehicles such as Unmanned Aerial Vehicles (UAVs) and manned aircraft. Furthermore, these antennas can be placed on a moving vehicle such as an airplane, naval vessel, or ground vehicle such as a train, automobile, and drone, and concurrently track a distant end antenna regardless of whether that antenna is also moving or not.

AESA antennas are expensive due to the complexity of the circuitry being used and the vast volume of elements that must be employed to replicate the gain and directivity of a parabolic reflector. AESAs also require a tremendous amount of power as they have a large number of transmit-receive (TR) modules (one at every element) all operating simultaneously when compared to parabolic antennas which require only one TR module at its single feed point. Furthermore, most implementations of AESA technology are narrow-bandwidth devices and are unable to operate across multiple frequency simultaneously.

The lens and methods described herein overcome these and other obstacles in the field to provide a low-cost, wide-angle, multi-beam, multi-frequency beamforming lens antenna.

SUMMARY OF VARIOUS EMBODIMENTS OF THE INVENTION

The method provides a low-cost, wide-angle, multi-beam, multi-frequency beamforming lens antenna for terrestrial wireless, satellite, and radar applications.

The present invention achieves technical advantages by using a variation of a Modified Luneburg Lens that allows a direct connection to a flat radiating antenna device as opposed to a curved radiating antenna device. By connecting the Planar Ultra-wideband Modular Array (PUMA) antenna to the Modified Luneburg Lens, optionally with an anti-reflective layer, the inventors created a new class of ultra-wideband lens antennas that allow for near or complete hemispherical coverage patterns across multiple frequency ranges, ideal for terrestrial wireless, satellite, and radar applications with unexpected improvements in transmission and reception of signals.

One embodiment of the present disclosure comprises a high-gain, wide-angle, multi-beam, multi-frequency beamforming electronically steered array lens antenna comprising a Luneburg lens with at least one planar interface in a southern hemisphere of the Luneburg lens and at least one PUMA array structure that is configured to function as a feed network to illuminate beams of the Luneburg lens simultaneously. The antenna may be connected between multiple networks operating at different frequencies In an embodiment, the PUMA array structure may be matched to the Luneburg lens via an anti-reflective layer, forming a single layer of material between dipole layers of the PUMA array structure and the Luneburg lens. The anti-reflective layer may be integrated into a top layer of dielectric in the PUMA array structure or may replace the top layer of dielectric in the PUMA array structure.

In an embodiment, elements of the PUMA array structure may be spaced unevenly, and each element may operate independently of adjacent elements.

In an embodiment, an illumination in a direction may be either increased or decreased, and a scan area of the antenna is increased to a full hemispherical coverage via adjusting a position of the planar interface.

In an embodiment, the southern hemisphere of the Luneburg lens may be flattened via Transformational Optics.

In an embodiment, the a high-gain, wide-angle, multi-beam, multi-frequency beamforming electronically steered array lens antenna may comprise a Luneburg lens with a planar interface at a bottom and a plurality of geometrical interfaces at a side of the Luneburg lens in a southern hemisphere of the Luneburg lens, and a plurality of PUMA array structures that is configured to function as a feed network to illuminate cells of the Luneburg lens simultaneously. The antenna is connected between multiple networks operating at different frequencies.

In an embodiment, the multiple geometrically designed interfaces between the PUMA and the Luneburg lens may provide for a higher field of view and a full hemispherical coverage of the sky.

In an embodiment, the antenna may be configured to switch between satellite communications, terrestrial communications, and radar applications.

Other features and advantages of the present invention will become apparent from the following more detailed description, taken in conjunction with the accompanying drawings, which illustrate, by way of example, the principles of the inventions.

In an embodiment, a modified Luneburg lens assembly can comprise a modified Luneburg lens with a flattened bottom is coupled to a feed assembly, which can be a printed circuit board since it is mating to a flat lens, and coupled to an associated electronics assembly, again which may be a printed circuit assembly (PCB).

In an embodiment, a modified Luneburg lens may comprise a flattened bottom.

In an embodiment, a continuous modified Lunberg lens may have a flattened top and bottom coupled with an anti-reflective layer on the top and bottom.

In an exemplary continuous modified Luneburg lens, the lens can comprise a flattened top and bottom with an anti-reflective layer. A discretized modified Luneburg lens with a flattened top and bottom with a top and bottom anti-reflective layer.

In an embodiment, a discretized flattened Luneburg lens may have a flat bottom and gradually shaped curved outside surface. The lens may be fabricated from multiple layers of material with different dielectric constants for realizing a gradient-index (GRIN) lens. The curves at the interfaces between the layers can be generalized. The interfaced sections can be non-concentric, or concentric ellipsoid sections.

BRIEF DESCRIPTION OF THE DRAWINGS

The advantages and features of the present invention will become better understood with reference to the following more detailed description taken in conjunction with the accompanying drawings in which.

DETAILED DESCRIPTION OF PREFERRED EMBODIMENTS

Figure 1:
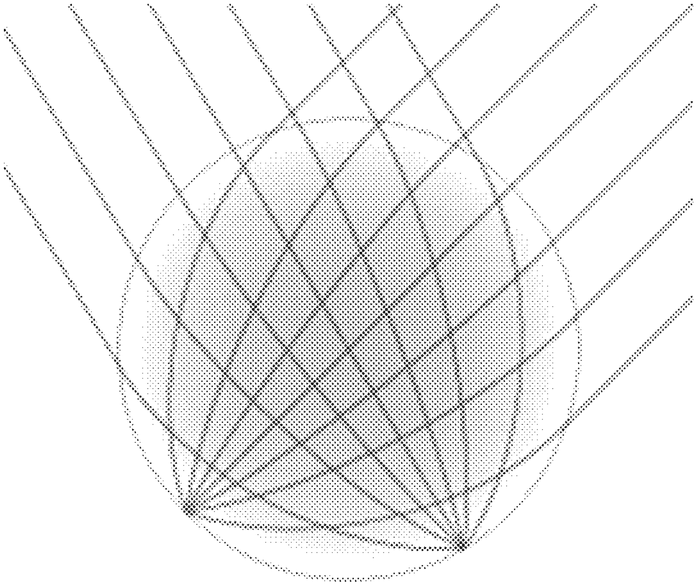
FIG. 1 depicts a typical Luneburg lens showing two different points of excitation and two beams being formed through the lens.

This disclosure provides for a high-gain, wide-angle, multi-beam, multi-frequency beamforming lens antenna that includes a Luneburg lens with at least one planar interface in the southern hemisphere of the Luneburg lens and a planar ultrawideband modular antenna (PUMA array) structure. The PUMA array structure is connected to at least one of the planar interfaces of the Luneburg lens and is configured to function as a feed network to illuminate cells of the Luneburg lens simultaneously. The antenna is connected between multiple networks operating at different frequencies. An alternative class of antennas, specifically lens-based antennas exist. U.S. Pat. No. 2,328,157.

Conventional spherical lens antennas are suited for multi-beam applications as they allow signals to travel through them at many various angles without interfering with one another. However, conventional spherical lens antennas are difficult and expensive to manufacture as the radio energy feed assemblages must be connected to the lens around the lower hemisphere, requiring a physical connection to various points along a curved surface. This makes it difficult to move a signal from one portion of the lens to another, usually requiring a complex mechanically driven moving feed assemblage. Multiple beams are even more difficult as the various moving mechanical assemblages must not interfere with one another. These factors also add to cost in manufacturing.

A new type of radio frequency optical lens, called a Modified Luneburg Lens, uses transformational optics (TO) mathematics to flatten the lower hemisphere of the spherical lens, allowing for a flat printed circuit board antenna to be connected to the lower hemisphere of the lens. The Modified Luneburg Lens has an inherently broadband nature to the device, allowing for signals in a plurality of octaves to transit the lens in the desired directions. U.S. Provisional Patent Application No. 62/940,018, filed 25 Nov. 2019, herein incorporated by reference in its entirety, describes an antenna that marries a PUMA class feed structure to a modified Luneburg lens to create a wideband antenna.

To date there has been no mechanism for connecting this lens to an ultra-wideband (UWB) antenna that can also transmit and receive signals in a plurality of octaves in frequency through many or all of the antenna ports of the Modified Luneburg Lens.

A new class of ultra-wideband antennas, one of which is called a Planar Ultrawideband Multiband Antenna (PUMA), use a unique configuration of dipoles in order to create a broadband antenna that can transmit and receive radio signals in a plurality of octaves of frequency. U.S. Patent Application Publication No. 2018/0040955. While UWB antennas such as the PUMA are able to transmit multiple beams simultaneously, the scan angle of the PUMA is only +/−55 degrees from boresite (zenith), below which the radiated signal begins to degrade in both insertion loss and axial ratio. Furthermore, the PUMA is typically used as an array of antennas and has not been connected to a lens to create a broadband lens antenna system.

UWB antennas and Luneburg Lenses have not been successfully connected to one another before. The challenge in doing so resides in connecting a flat array antenna to a spherical object, and matching the impedance of the UWB antenna to the Luneburg Lens, as typically both devices must have their impedance match free space, resulting in a complex matching challenge.

One practical problem with graded dielectric lens antenna is that the currently used methods for manufacturing the lens structure, such as additive manufacturing, are slow, expensive, and prone to problems. A large lens can take several weeks to print using additive manufacturing, and a glitch anywhere during the process can ruin the entire lens, so extreme caution must be taken to avoid mistakes. The methods described herein encompass a new process and structure for manufacturing a lens that is faster, less expensive, and suitable for higher volume manufacturing.

The disclosure further provides for a method to design and build non-concentric gradient-index (GRIN) dielectric structure. A method to build an anti-reflective layer enabled modified Luneburg lens antenna using non-concentric dielectric shells is described. The method utilizes non-concentric spherical shaped dielectric structures to build a modified Luneburg lens and incorporated with an anti-reflective layer at the bottom. The anti-reflective layer can be built by using several non-concentric cylindrical shaped dielectric shells. The process may be extended to other non-uniform Luneburg and stepped gradient lenses. For example, non-uniform modified Luneburg geometries include but Cylindrical, elliptical, cupcake (truncated pyramid base), and convex shapes. These non-uniform Luneburg geometries may be discretized modified Luneburg lens.

The inventors explored a new technological approach that seemed to be a promising field of experimentation, but the technical information in the art only gave general guidance as to the particular form of the system and methods described herein or how to achieve it. The inventors suspiring found that by connecting the two elements by removing the top dielectric layer of the PUMA array and using the Modified Luneburg Lens to match the impedance of the dipole elements of the PUMA to the Luneburg lens instead of matching the impedance to free space. By connecting the PUMA array to the Modified Luneburg Lens with the removal of the top dielectric layer of the PUMA, the inventors created a more easily manufacturable lens antenna that provides multiple simultaneous beams with high directivity and low side-lobes. Instead of using the PUMA as an array of feeds that create gain through phasing, the inventors can illuminate one element of the PUMA at a time in order to develop a transmit and receive beam in the desired direction based on where the beam illuminates the lens. The spacing between the PUMA array and Modified Luneburg Lens impacts the grating lobes and side-lobe interference is preferably minimized.

Connecting a Modified Luneburg Lens to a typical phased array antenna, such as a patch array or slot array, requires multiple independent feed networks, each possessing their own phase shifters and other key elements, increasing the cost and complexity of the apparatus. By implementing the PUMA array instead of a typical phased array, the inventors found that no phase shifters are necessary, as well as no dielectric layer for the PUMA.

Embodiments of the present disclosure provide systems and methods that enable an ultra-wideband, high-gain, wide-angle, multi-beam array/lens antenna system that creates an electronically steered array (ESA) lens antenna.

A high-gain, wide-angle, multi-beam, multi-frequency beamforming lens antenna that includes a Luneburg lens with at least one planar interface in the southern hemisphere of the Luneburg lens and a planar ultrawideband modular antenna (PUMA array) structure. The PUMA array structure is connected to at least one of the planar interfaces of the Luneburg lens and is configured to function as a feed network to illuminate cells of the Luneburg lens simultaneously. The antenna is connected between multiple networks operating at different frequencies. A method to design and build non-concentric gradient-index (GRIN) dielectric structure is proposed. A method to build an anti-reflective layer enabled modified Luneburg lens antenna using non-concentric dielectric shells is presented. The method utilizes non-concentric spherical shaped dielectric structures to build a modified Luneburg lens and incorporated with an antireflective layer at the bottom. The anti-reflective layer is built by using several non-concentric cylindrical shaped dielectric shells. The process could be extended to other non-uniform Luneburg and stepped gradient lenses.

Definitions

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

"Relative permittivity," also known as "dielectric constant," abbreviated as "Er," as used herein, refers broadly to the permittivity expressed as a ratio relative to the vacuum permittivity. Permittivity is a material property that affects the Coulomb force between two point charges in the material.

Luneburg Lens for Beamforming & Beam-Steering

Figure 2:
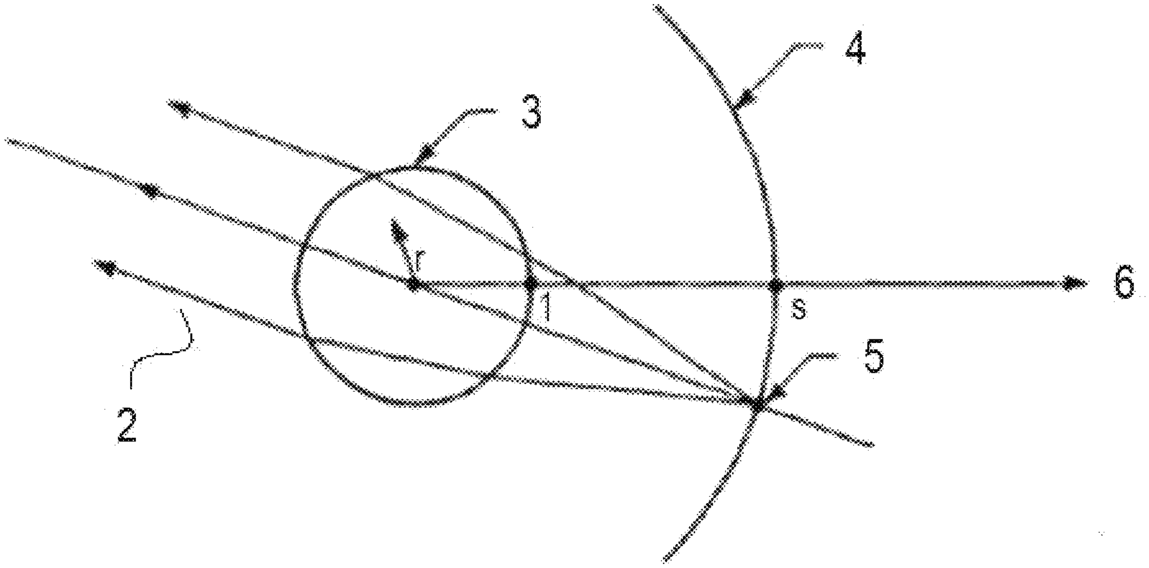
FIG. 2 illustrates a principle of Generalized Luneburg lens.

FIG. 1 and FIG. 2 illustrate Luneburg lenses. In reference to FIG. 2, a Luneburg lens 3 having a surface 1, shows the columnated electromagnetic waves emanating from the lens 2 with the focal sphere 4 locating the focal points for the lens and the point source 5 as the ideal point source located on the focal sphere. 6 shows the normalized radial distance from the lens. FIG. 2 shows a generalized Luneburg lens with a focal point outside the lens. The focal point 5 is on an imaginary sphere 4 surrounding the lens. For a Luneburg lens, the focal point can be outside the surface of the lens as shown in this figure, or it can be on the surface of the lens as shown in FIG. 1.

Due to the inherent property of essentially infinite focal points, a Luneburg Lens is an attractive option for an antenna because it can focus on radio waves emanating from any direction.

From a practical standpoint, there are three characteristics of a real lens that present challenges. Since the lens is spherical, the feeds must somehow be attached to the outside of a round structure. Though not an impossible task, this will require an elaborate three-dimensional structure to be created to support these feed assemblages. This most often involves a manual process or a complex automated process to assemble and align the structure. For traditional feeds such as horn and patch antennas, the lens structure presents a radio frequency (RF) impedance to the feed. In order to match the feed to the structure, an RF matching network must be designed in order to achieve acceptable performance when the feed is mated to the antenna. Both RF matching networks and traditional feeds tend to be limited in bandwidth. If constructed properly, the lens itself is broadband, but the resulting antenna assembly is narrowband due to the limitations of the feed and the match. Since the dielectric is non-uniform, it is not a simple process to manufacture the lens. Approximations of Luneburg lenses are made using layers of dielectric materials with varying dielectric constants, however making a lens with a continuously varying dielectric constant has been elusive.

Figure 3:
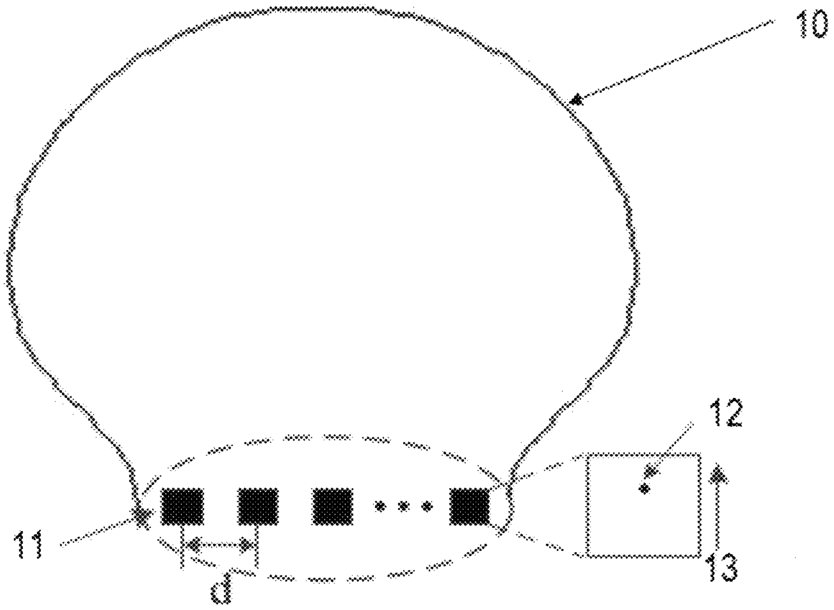
FIG. 3 depicts a cross-section view of another example of a particular modified Luneburg lens 10, coupled to a planar antenna array 11, with a blow-up of the element with feed point 12 and the direction of the polarization 13.

FIG. 3 illustrates a modified Luneburg lens. A graded index modified Luneburg lens can be coupled to an array of antenna feeds and beam switching circuitry.

FIG. 3 depicts a Flattened Luneburg lens 10 coupled to a planar array 11, with a feedpoint for an element 12, and the direction of the E-field polarization 13.

The problem of having to feed the lens with a circular (non-planar) feed arrangement was solved by using TO mathematics to transform the feed surface from one that is round to one that is flat (planar). Manufacturing a flat (planar) feed structure is poorly accomplished using currently available printed circuit board development techniques. The problem of manufacturing the continuously-varying dielectric lens was solved by using additive manufacturing (also known as three-dimensional (3D) printing) to create a structure with a non-homogenous dielectric constant. This was accomplished by using the additive manufacturing process to create a structure that incorporates small air gaps of varying size within the dielectric material. If the air gaps and the dielectric structure are small with respect to the wavelength of the desired signal, the structure approximates a dielectric constant of 1.0. If the dielectric constant of the structure material is 3.0, the range of possible dielectric constants in the structure can vary from 3.0 (no air pockets) to close to 1.0 (very small amounts of dielectric material with mostly air gaps). The printing process builds the structure with small individual blocks called cells and allows the dielectric constant to be varied on a cell-by-cell basis. The cells can be very small with respect to the wavelength of the signal, so good granularity in the gradient of the dielectric constant is achievable.

A specific problem with Luneburg lenses is the match between the feed and the lens. Instead of attaching the feed directly to the lens, which has a varying match to the feed as you go from center to the edge of the flat part of the structure, an interface layer (referred to as an 'anti-reflective layer') was inserted between the feed and the modified lens. This layer is analogous to a matching network in an RF circuit—it is designed so that a good match between the feed and the lens is obtained across the entire interface surface. Additionally, this layer can be designed to be as broadband as needed, so limited bandwidth is not a significant problem.

Manufacturing Method for Discretized Luneburg Lens and Systems Comprising the Same This disclosure describes a method to design and produce a low-cost, multi-beam, multi-band electronically steerable lens antenna for terrestrial wireless, satellite, and radar applications. The present invention achieves technical advantages by using a method to manufacture a lens with a discretized dielectric profile by assembling layers of different constant dielectric materials. Present methods for manufacturing non-spherical dielectric graded antennas involve a slow and machine-intensive process whereby dielectric material is slowly and precisely added using additive manufacturing techniques. The result is that even a small to moderate sized antenna lens can take weeks or months to produce, and if there are any glitches in the process, the whole process must be started over.

The process described herein relies on a concept that a non-spherical graded dielectric can be approximated using layers of constant dielectric material. A classic Luneburg lens has a continuously varying dielectric. For a classic Luneburg lens, this continuously varying dielectric can be emulated using steps of constant dielectric materials. The systems and methods of manufacture of modified Luneburg lenses, including those with an antireflective layer, and other non-uniform lens structures, using a discretized dielectric process are described herein.

In methods described herein, the individual layers can either be cast in a mold, machined from a solid piece of material, or made using an additive manufacturing process. The individual layers are then assembled into a complete antenna. Using computer aided design to optimize the discretized layers, this process yields an antenna with excellent RF performance while allowing an antenna to be manufactured start-to-finish in a day or less, and without requiring an expensive precision 3D printing machine.

For example, a lens antenna created using the traditional additive manufacturing requires a precision additive manufacturing machine that builds up very fine layers of precision-placed material. Since the material is placed in fine layers in a precise fashion, the process requires an expensive machine, and it is a lengthy process. A lens on the order of 10 inches can take 6 to 8 weeks using a dedicated machine costing hundreds of thousands of dollars. This is not conducive to manufacturing lenses except for the most exotic applications.

Figure 14:
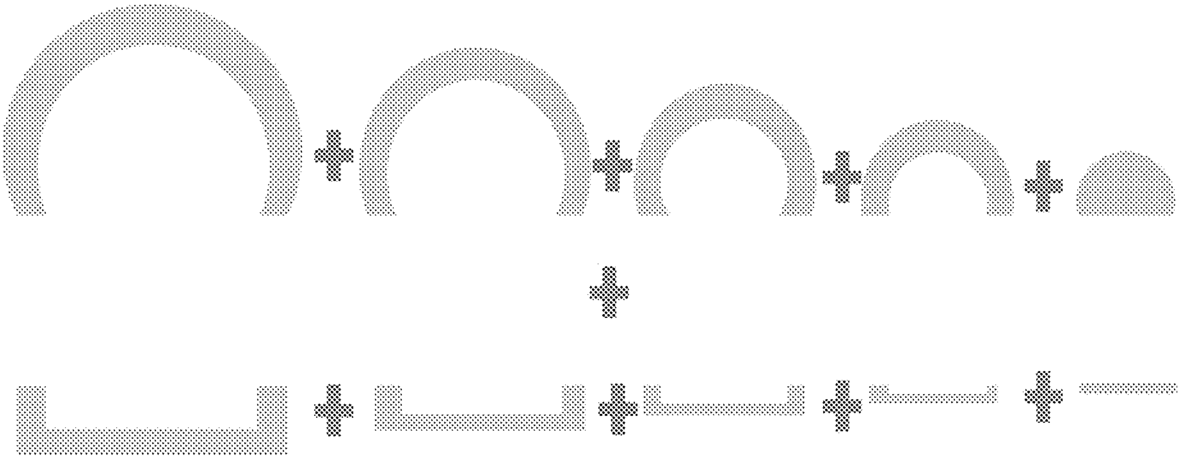
FIG. 14 depicts an embodiment of manufacturing a discretized Luneburg lens comprising fabricating discrete pseudo-cylindrical structures and lens shells, then assembling them to form a discretized Luneburg lens.
Figure 15A:
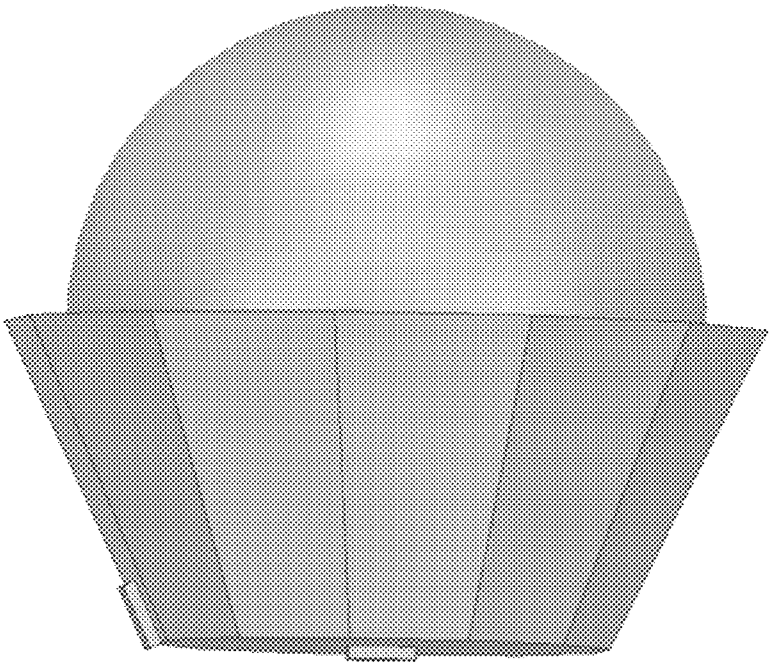
FIGS. 15A and 15B depicts a continuous dielectric cupcake shaped Luneburg lens (15A) and a discretized dielectric cupcake-shaped lens (15B). Each layer and side of the modified Luneburg lens with a pyramidal base ("cupcake shape") may have a relative permittivity ($\varepsilon_r$) value, that may be the same or different from other relative permittivity ($\varepsilon_r$) value. In an embodiment, the bottom hemisphere of the modified Luneburg lens may have a flat bottom with a series of planar sections ("cupcake shape"). At least one planar interface in the lower hemisphere of the cupcake-shaped Luneburg lens, continuous or discretized, may be coupled to a planar ultrawideband modular antenna (PUMA array) structure. The PUMA array structure may be connected to at least one of the planar interfaces of the Luneburg lens and is configured to function as a feed network to illuminate cells of the Luneburg lens simultaneously. The planar interferences in the lower hemisphere of the truncated pyramidal (cupcake-shaped) Luneburg lens, continuous or discretized, may be coupled to an anti-reflective layer, which may be a discretized anti-reflective layer.
Figure 15B:
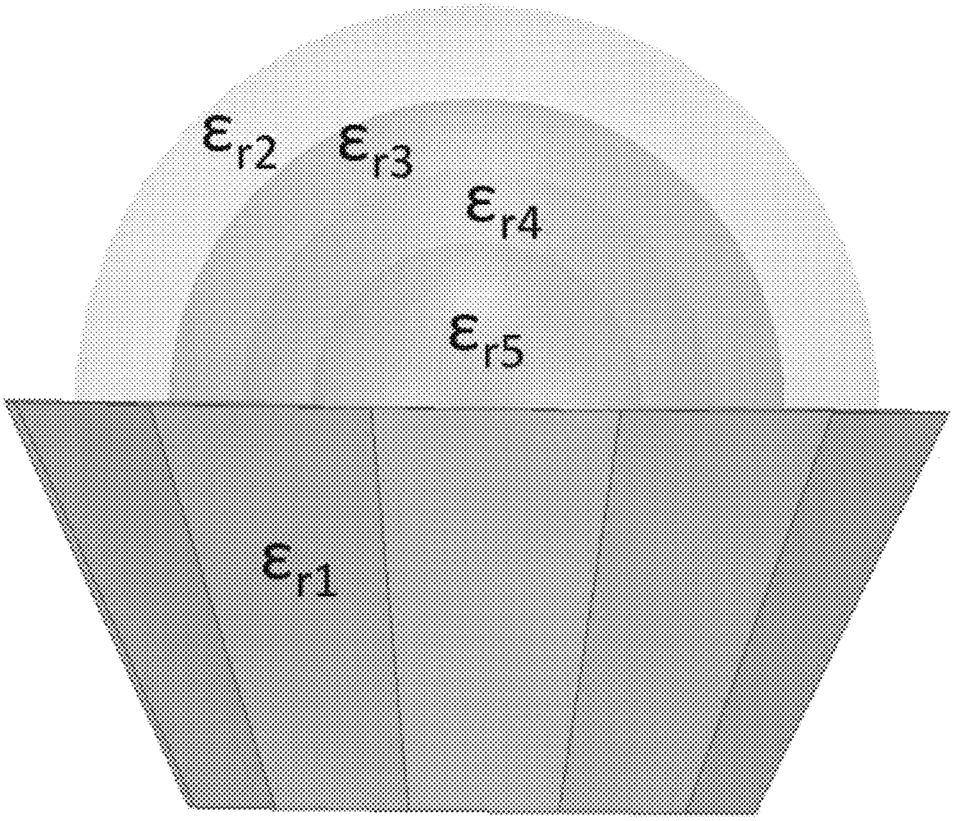

In contrast, for the manufacture of a discretized Luneburg lens as described herein, each of the layers is cast individually, then they are nested together and assembled using an adhesive. See FIG. 14. The layers shown in FIG. 14 are nested but not completely aligned to give a better view of the manufacturing process. Using this method, each layer is cast in an individual mold or made using a subtractive manufacturing process (machining), allowing the different layers to be made in parallel. A material suitable for molding may be a two-part poured resin and an adhesive may be a two-part epoxy. For machined parts, materials such as Delrin® (polyoxymethylene POM) or Lexan® (polycabonate) can be used.

The material used in the system and methods described herein may be a fast-setting resin material which cures in a period of hours to overnight. Materials such as Ryton® (Poly(p-phenylene sulfide) polymer), Polystyrene and Polyurethane can be used for casting.

The dielectric constant of the resin is varied from layer to layer by varying the chemical composition. If special material properties are needed, some of the layers can also be machined (subtractive manufacturing) from solid pieces of material.

The inventors explored a new technological approach that seemed to be a promising field of experimentation, but the technical information in the art only gave general guidance as to the particular form of the system and methods described herein or how to achieve it. In contrast with existing approaches, the inventors first designed a modified Luneburg lens using transformational optics, transformed the design to a discretized design, then manufactured that lens utilizing the layered dielectric approach to obtain an antenna showing an unexpected improvement in performance. The inventors adapted the process for modified Luneburg lenses, including an anti-reflective layer. The techniques described herein can be extended to other similar antennas designed using transformational optics. Once designed, all of the sections can be made in parallel, reducing manufacturing time, and then assembled to make the final lens.

In contrast, lenses designed using transformational optics are customarily manufactured using additive manufacturing. This additive manufacturing process is lengthy, expensive, and prone to manufacturing errors, and potentially yields a lens that is susceptible to damage from shock and vibration. An example of an additive manufacturing process is Fused Deposition Modeling (FDM) whereby solid material is melted, extruded through a nozzle, then deposition layer by layer to create a 3-dimensional object. In order to achieve precision, small nozzles must be used and they must deposit the material slowly. For a graded dielectric lens, this entails creating layers of intricate structures, alternating between material and air gaps, to achieve the desired electrical properties. To achieve the needed precision at the scales required, a typical lens can take weeks to print using a very expensive precision machine. If there is an error anywhere in the process, the entire assemble may need to be scrapped. The system and methods described herein eliminates this problem, resulting in a more cost-effective, rapid, and efficient method of producing a better lens for antenna systems.

The inventors developed an efficient method of the manufacture of Luneburg radio-frequency (RF) structures using resin casting and machining of dielectric materials to the manufacture of a new class of radiofrequency (RF) lenses, namely modified Luneburg Lenses designed using transformational optics.

The method may comprise the following steps: A modified Luneburg lens is designed with a continuously variable dielectric constant, potentially including an anti-reflective layer, using transformational optic (TO) techniques. This TO lens design is modified to have discretized layers. This transformation from a continuously variable dielectric to a discretized dielectric. The discretized modified Luneburg lens and antireflective layer are fabricated using non-concentric dielectric 'shells'. These individual shells can be manufactured using one of three techniques, or any combination of the three: (a) Resin casting—a liquid resin is formulated and poured into a mold of the desired shape; (b) Subtractive manufacturing of a solid dielectric—the desired shape is subtractive manufactured (machined) from a solid piece of material having the appropriate dielectric properties; (c) Additive manufacturing—an additive manufacturing process is used to create one or more of the shells; or (d) a combination thereof. Once the individual shells or layers are manufactured, the individual shells are assembled together to form an antenna assembly.

Exemplary advantages of the systems and methods described herein over known processes are: (a) Faster manufacturing-instead of taking weeks or months to manufacture an antenna, an antenna can be completed in a period of hours to days; (b) Reduced need for expensive machinery—expensive machinery, such as a 3D printer, is not needed for this process; (c) Lower cost—because of the faster manufacturing time and not needing expensive machinery, the cost is lower; (d) Increased manufacturing capacity—since expensive machinery is not needed, more molds and tooling can easily be made to make more lenses in parallel; (e) Larger antennas—using this process, it will be possible to make larger antennas (up to 1 meter or larger), which is beyond the capability of current additive manufacturing processes; and (f) combinations thereof.

Ultrawideband (UWB) Array Antenna Structure

Several different instantiations of flat panel and phased array antennas are known. An ongoing challenge with these antennas has been to develop an antenna that is both ultra-wideband (UWB) and easily manufacturable. There exist antennas that are wideband but not easily manufacturable (such as the Vivaldi array) and there are many different flat panel antennas that are easily manufactured but which only operate over one or two frequency bands.

A challenge for a particular Luneburg lens implementation is that because a traditional Luneburg lens is completely round, feeds must be arranged around the outside of the round lens. This creates a mechanical challenge, and feeds on one side of the antenna obstruct the pattern of feeds on the other side of the antenna.

Figure 4A:
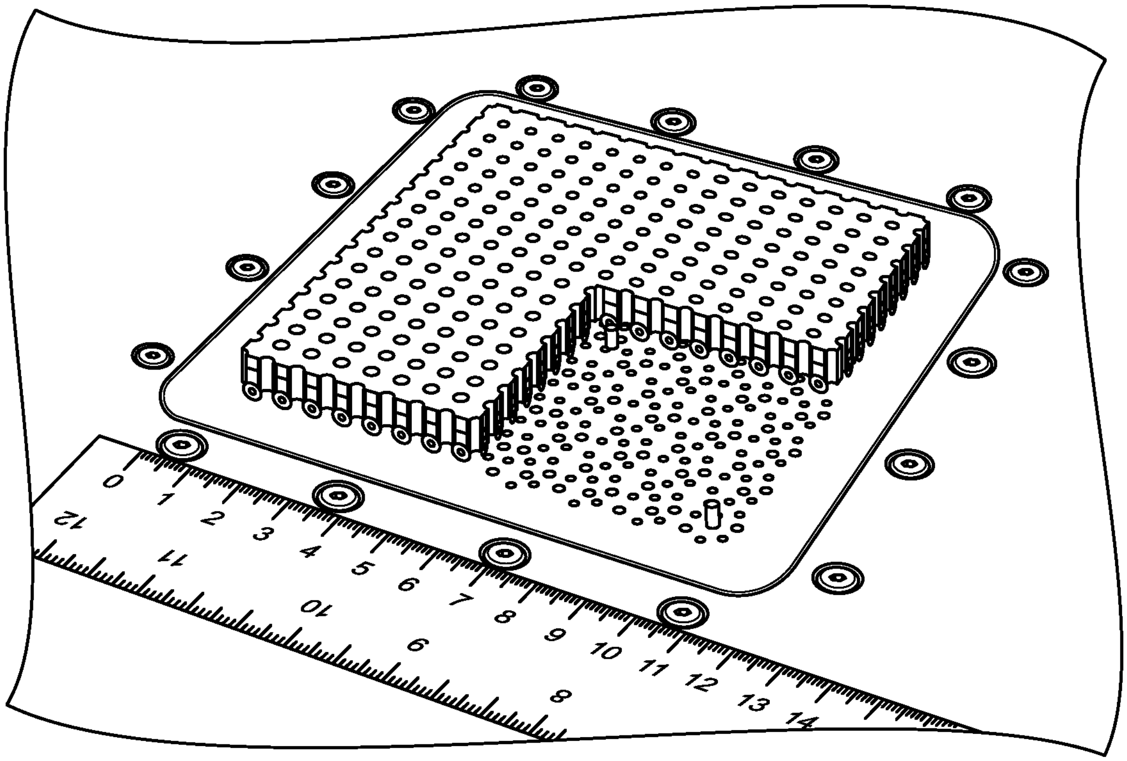
FIGS. 4A and 4B depict examples of PUMA implementation.
Figure 4B:
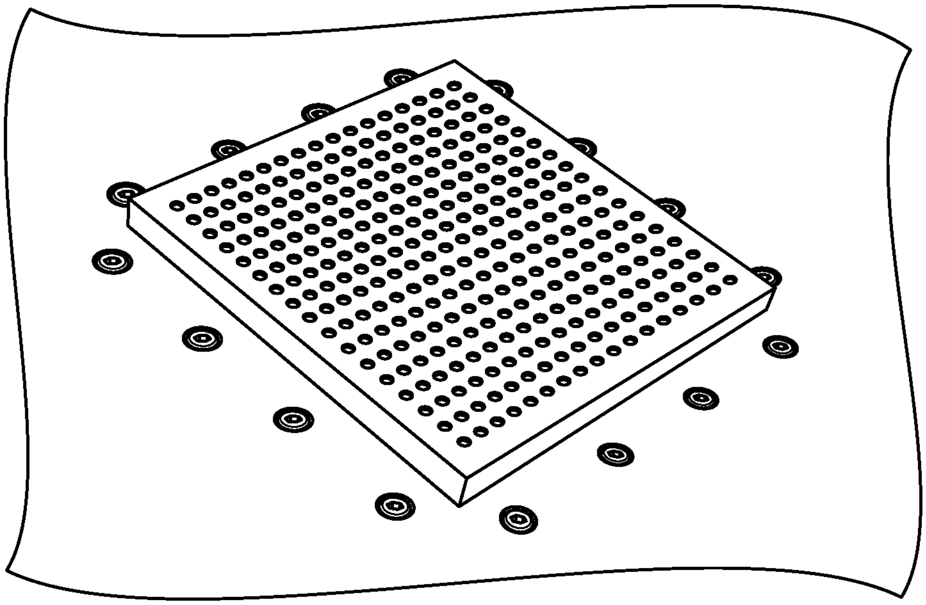

An antenna called the Planar Ultrawideband Modular Array (PUMA) is both wideband (6:1 bandwidth) which is also manufacturable using standard Printed Circuit Board (PCB) processes by board houses using standard materials such as Rogers 3000 and 6000. FIG. 4 shows examples of PUMA.

UWB antennas such as the PUMA have the following properties that make them useful for SATCOM and terrestrial microwave communications: They can be manufactured by different PCB board houses using standard PCB processes. They can be made to operate UWB (6:1 bandwidth ratios are common). They retain good cross-polarization and gain performance up to 60 degrees scanned off-axis from boresite.

Figure 5A:
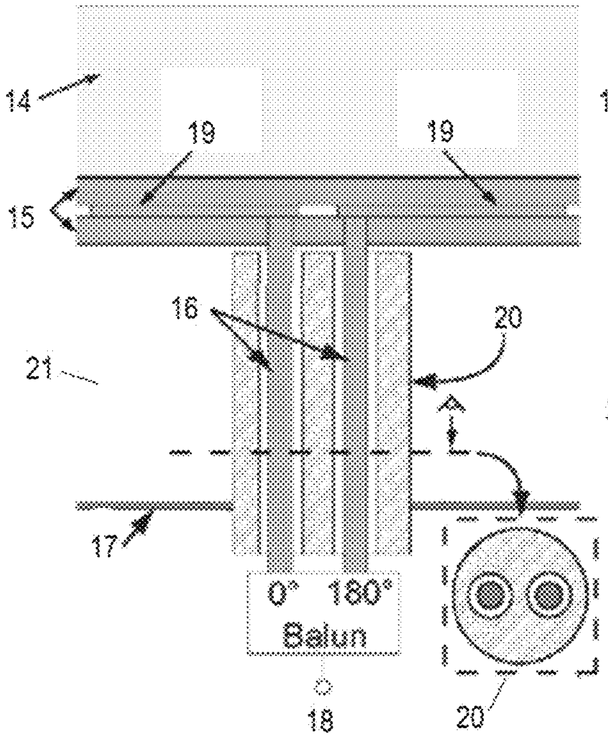
FIG. 5A depicts a cross-section view of a PUMA implementation.
Figure 5B:
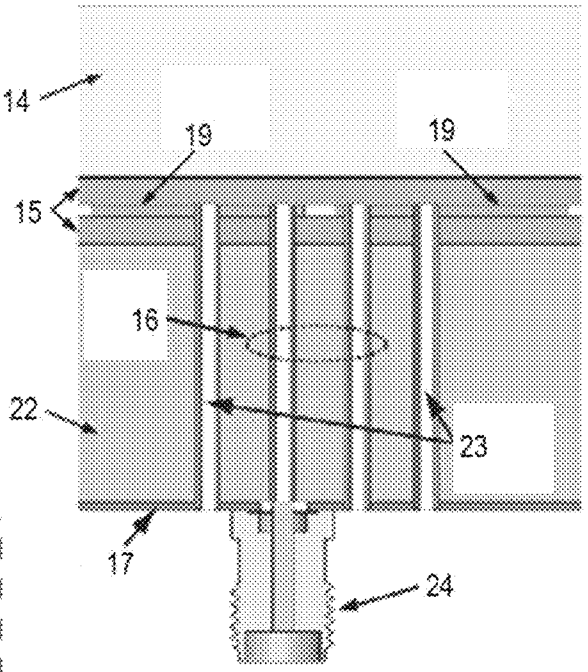
FIG. 5B depicts another cross-section view of the PUMA implementation of FIG. 5A.

FIG. 5A and FIG. 5B show the structure of the PUMA array. This figure shows the detail of a PUMA unit cell, which is used as a feed for a modified Luneburg lens including the top dielectectric superstrate ($\varepsilon_{r1}$) 14, bonding and dielectric layers ($\varepsilon_{r1}$) 15, PUMA feed vias 16, ground plane 17, input port 18, dipole arm 19, cross section of feeds and feed dielectric 20, inner dielectric layers ($\varepsilon_{r0}$) 21 and ($\varepsilon_{r3}$) 22, plated vias 23, and coaxial connector 24.

There is a trace layer, shown in FIG. 9B as Dipole Arms suspended above a ground plane by a dielectric layer and connected with vias to the layer shown as the ground plane. Above the trace layer there is an additional dielectric layer shown in FIG. 9B. The spacing of the trace layer above the ground plane and the thickness and chosen material of the dielectric layers determines the frequency, bandwidth, and performance of this class of antennas.

Connecting the Lens to the Array

The modified UWB Luneburg Lens provides the following benefits: Modified optics allow for a flat-faced feed interface, Optics are inherently very wideband, These can now be manufactured using currently-available additive manufacturing techniques, The shape of the lens inherently supports very wide-angle coverage (up to +/−60 degrees off boresite in a semi-hemispherical coverage pattern), and the lens is inherently efficient (efficiencies of 70% or greater—on par with parabolic reflectors).

The UWB antenna class such as a PUMA provides the following benefits: Extremely wideband (6:1 bandwidth ratio) operation with directive signals, Excellent off-axis performance up to +/−60 degrees off boresite in a semi-hemispherical coverage pattern, and Manufacturable using standard PBC fabrication techniques.

The present invention is to take a new class of UWB Luneburg Lenses that provide a flat (planar) interface in the southern hemisphere of the lens to which an array can be mated and connect that to an UWB planar array such as the PUMA. Further, the discretized Luneburg lens described herein may be used. The inventors created a new class of UWB lens antennas that utilizes a UWB array such as a PUMA as a feed network to illuminate several cells of the Modified Luneburg Lens simultaneously, including discretized Luneburg lens described herein. This new class of UWB lens antennas has the following properties:

a. Wideband frequency coverage (6:1 bandwidth ratio) allowing for operation in multiple frequency bands simultaneously
b. Multiple simultaneous beams (potentially complete sky coverage with enough beams illuminated simultaneously)
c. Wide area sky coverage (up to a full-hemispherical pattern
d. No moving parts required to operate
e. Excellent efficiency relative to other directive antenna solutions (such as parabolic reflectors)

a Flat Interface Between the Modified Luneburg Lens and the UWB Antenna

Figure 6A:
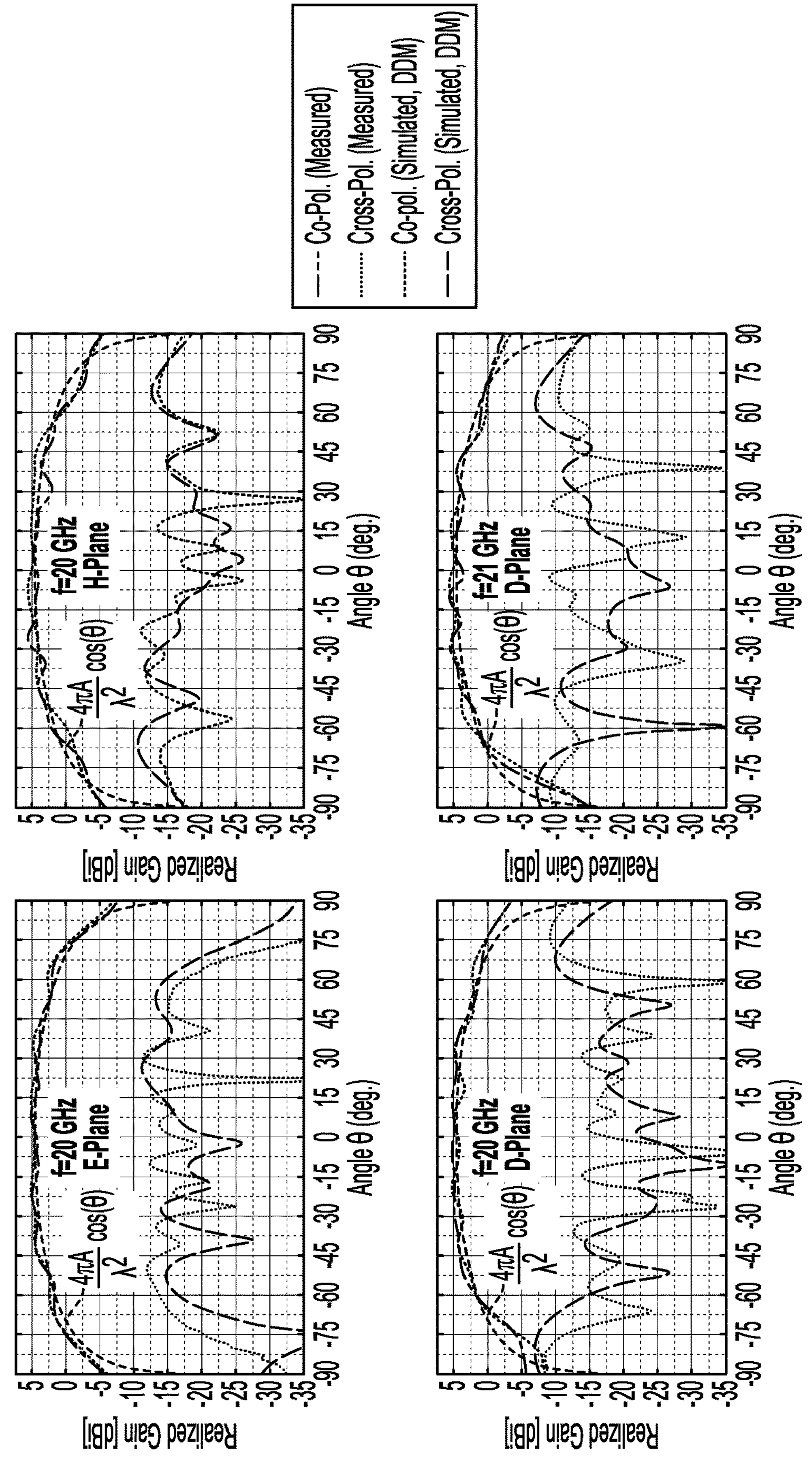
FIG. 6A depicts graphs showing measured gain in co-polarization and cross-polarization at specific frequencies, in accordance with the present disclosure.
Figure 6B:
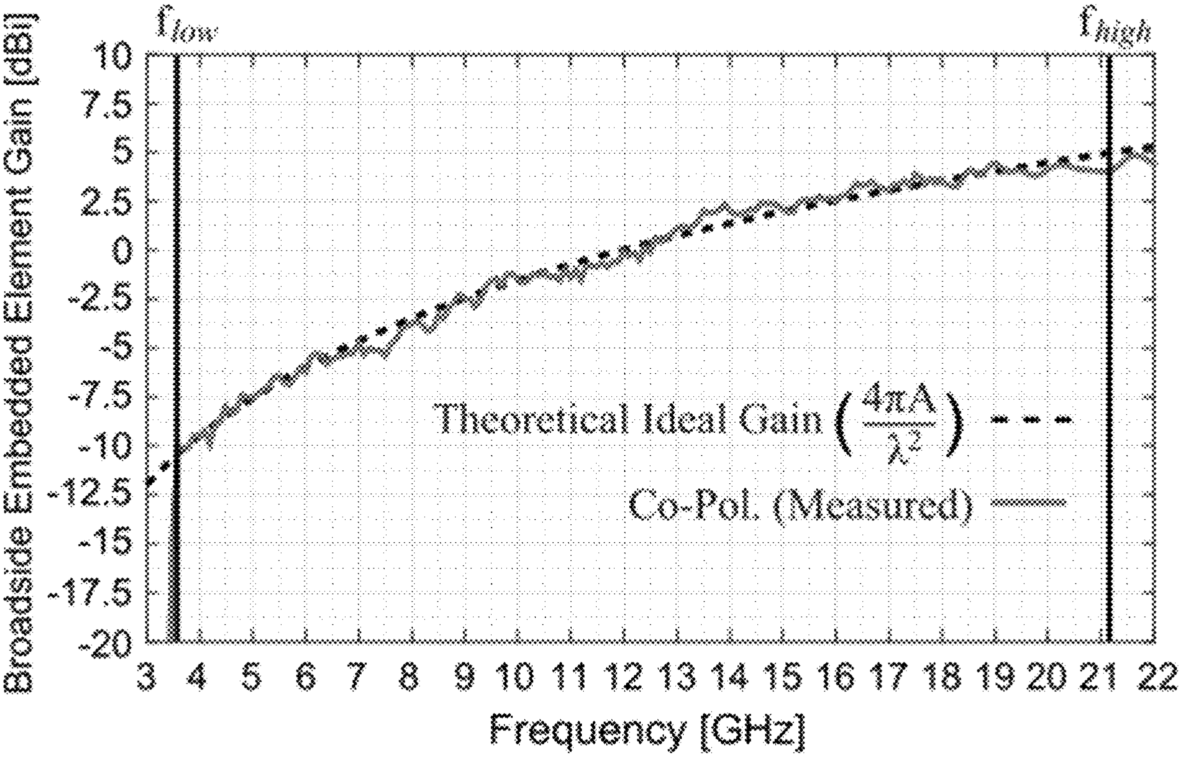
FIG. 6B depicts a graph showing measured element gain across a broadband range of frequencies, in accordance with the present disclosure.

FIG. 6A is graphs showing measured gain in co-polarization and cross-polarization at specific frequencies and FIG. 6B is a graph showing measured element gain across a broadband range of frequencies. The plots of the graphs show that this new design allows for an extremely broadband transmission and reception of signal in a bandwidth ratio of 6-to-1, meaning that the antenna can operate in multiple microwave frequency bands simultaneously. This allows a single antenna to operate on a multitude of networks such as cellular, microwave, terrestrial and satellite networks. Doing so allows users to minimize the number of purpose-built antennas that are used for signal communications. The bandwidth ratios for the systems described herein may be 3:1, 4:1, 5:1, or 6:1.

This new design allows for a multitude of signals to be transmitted and received simultaneously in multiple directions. By itself, the PUMA array can transmit signals in a single direction, however connecting the PUMA to the Luneburg lens we change the way the PUMA is used. Instead of an array of signals being transmitted and received through all of the ports simultaneously creating the gain, only one signal is sent through one port at a time, which then is directed in a specific direction through the Luneburg Lens.

This new design allows for a multitude of signals to be transmitted and received simultaneously in multiple directions in multiple frequency bands as well. This means that the single antenna can connect between multiple networks operating at different frequencies, which was not possible using existing systems.

The design described herein allows for the Modified Luneburg Lens to increase the field of view (FOV) to full hemispherical coverage (360 degrees azimuth, +/−90 degrees elevation). Prior to this invention this was not possible, with most Modified Luneburg Lens designs operating to only +/−55 degrees elevation. This enables a single antenna to track signals from the horizon to zenith, allowing for terrestrial, microwave, and satellite signals to be transmitted and received, as well as a full-sky RADAR tracking capability.

This design removes all moving parts from the antenna, as the Luneburg lens is a static beamformer that does not need to move in order to aim the signal in the desired direction. Unlike mechanical antenna systems, this design will have a much longer life cycle as there are no active components, and passive components tend to have much longer life cycles. Furthermore, unlike other antennas, such as active electronic steered array (AESA) antennas, that do not have moving parts, this antenna does not require a tremendous amount of power, as the beamforming is done in the passive Luneburg Lens element as opposed to digital beamformers that require a tremendous amount of power. The power savings for the systems described herein over a typical AESA antenna is 80%.

This antenna has excellent efficiency (as high as 90%) and high gain properties when compared to other directional antennas such as parabolic antennas (60% typical). This allows for smaller antennas to be used than would be possible with a parabolic. Furthermore, when compared to an AESA antenna, this design requires less surface area for the same amount of gain as the Luneburg lens operates as the beamformer and the transmitter and receiver are closer to the desired signal than would be in a traditional AESA architecture.

The flat interface between the PUMA and the Luneburg Lens allows for a connection between two devices that would not have been possible before, as a traditional Luneburg lens would be completely spherical, and a PUMA is a planar array of feed assemblies. By adjusting the positioning of the flattened assemblies we can increase or decrease the illumination (gain) in certain directions, and we can increase the scan area of the antenna to full hemispherical coverage (360 degrees azimuth, +/−90 degrees elevation).

A variation of this design that includes multiple flat interfaces at varying geometries will allow for full hemispherical coverage.

Figure 12A:
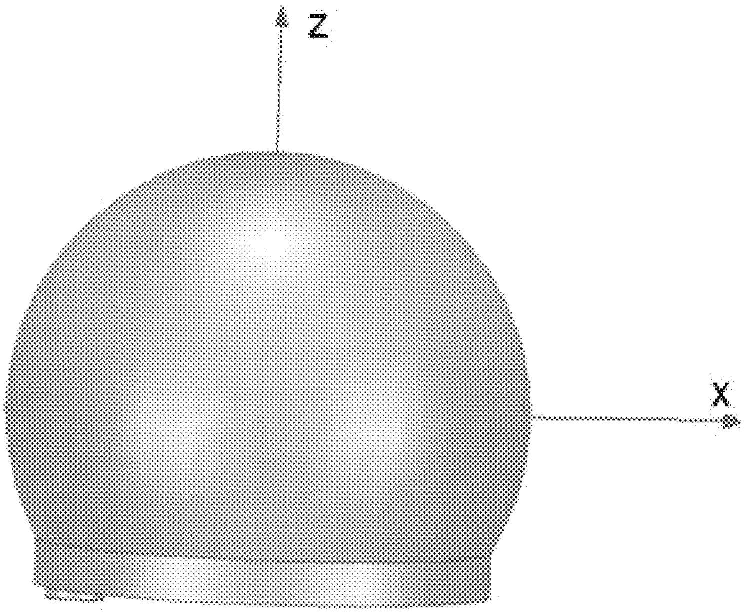
FIGS. 12A and 12B depicts two embodiments of a modified Luneburg lens, continuous lens (12A) where the lens material is in a single continuous layer, and (12B) discretized lens, where the lens material is organized into discrete concentric layers.
Figure 12B:
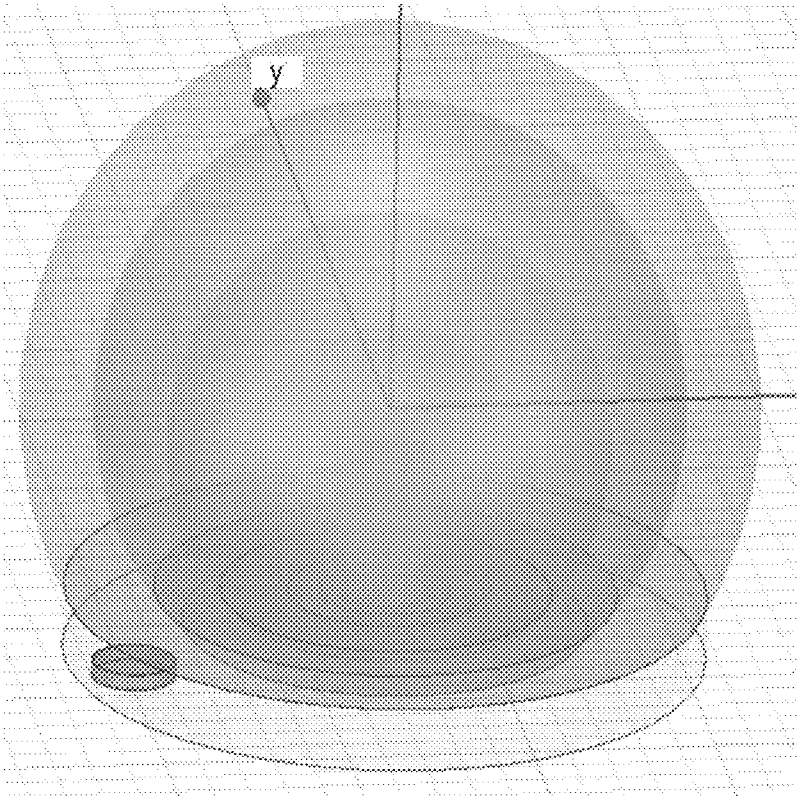
Figure 13A:
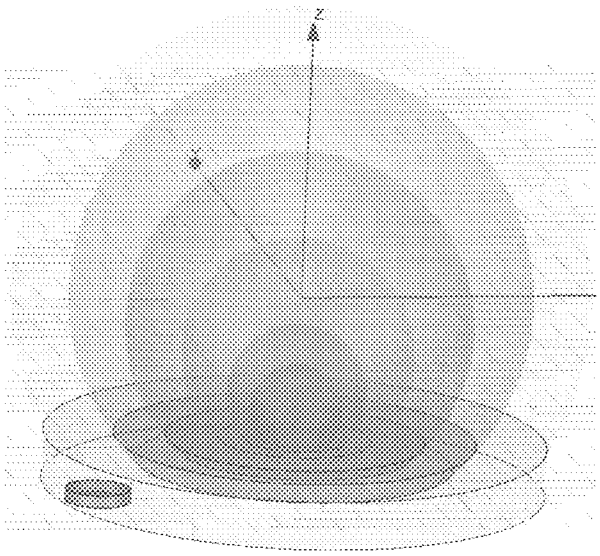
FIGS. 13A, 13B, and 13C depicts an embodiment of a modified Luneburg lens comprising a flat anti-reflective layer at the bottom of the modified Luneburg Lens (13A), a cross section of the modified Luneburg lens with a flat anti-reflective layer at the bottom showing the discrete, concentric layers each with a relative permittivity (dielectric constant) [$\varepsilon_r$], which may be the same or different, and the layers may be of the same or different thickness; (13B) depicts a cross-section of the discretized modified Luneburg lens showing the concentric layers with a relative permittivity ($\varepsilon_r$); and (13C) depicts a top view of the discretized anti-reflective layer at the bottom of the discretized modified Luneburg lens, each layer having a relative permittivity ($\varepsilon_r$). The relative permittivity ($\varepsilon_r$) value may be between about 1 and 20. The relative permittivity ($\varepsilon_r$) value may be about 1, 2, 3, 4, 5, 6, 7, 8, 9, 10, 11, 12, 13, 14, 15, 16, 17, 18, 19, or 20. The relative permittivity ($\varepsilon_r$) value is preferably about 1, 2, 3, 4, or between about 1-4.
Figure 13B:
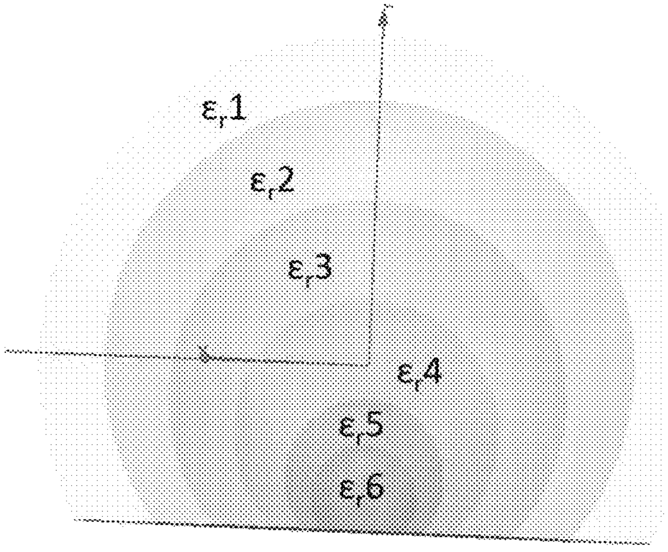
Figure 13C:
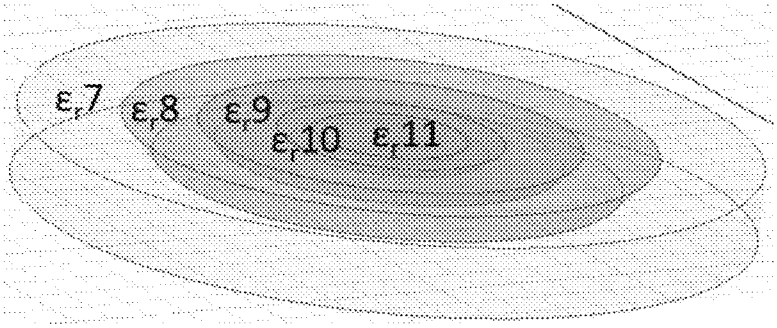

A high-level diagram of the proposed lens antenna system is shown in FIG. 12. The figure shows a modified Luneburg lens fed by a PUMA array structure with an anti-reflective layer to provide a broadband match and to marry the two structures.

Figure 8A:
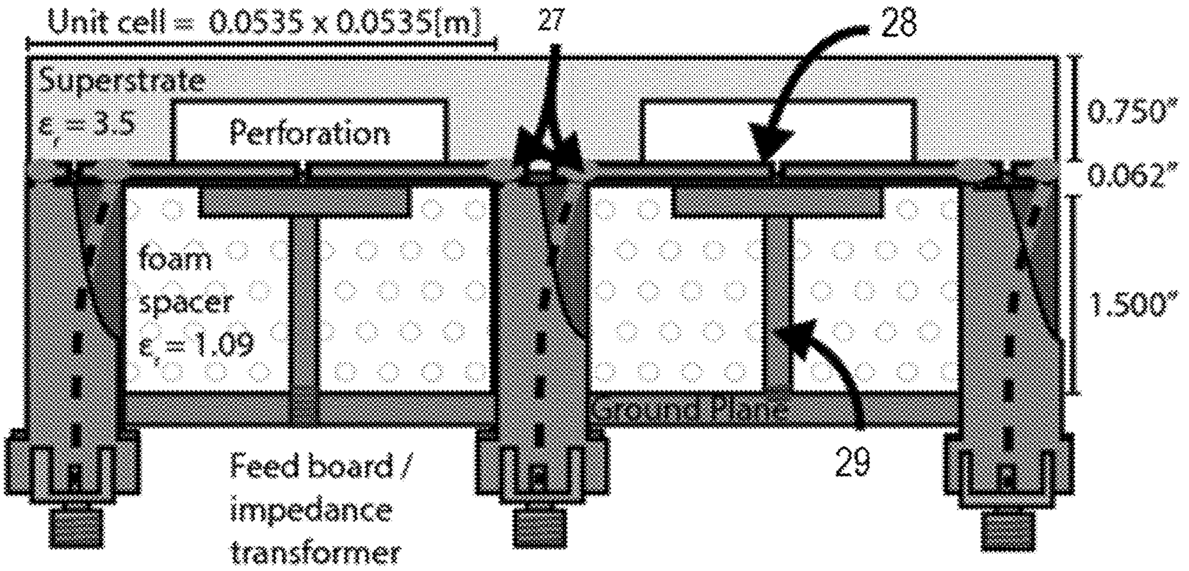
FIG. 8 depicts (8A) a cross-section view of a PUMA array, in accordance with the present disclosure; and (8B) a perspective view of the PUMA array, in accordance with the present disclosure.
Figure 8B:
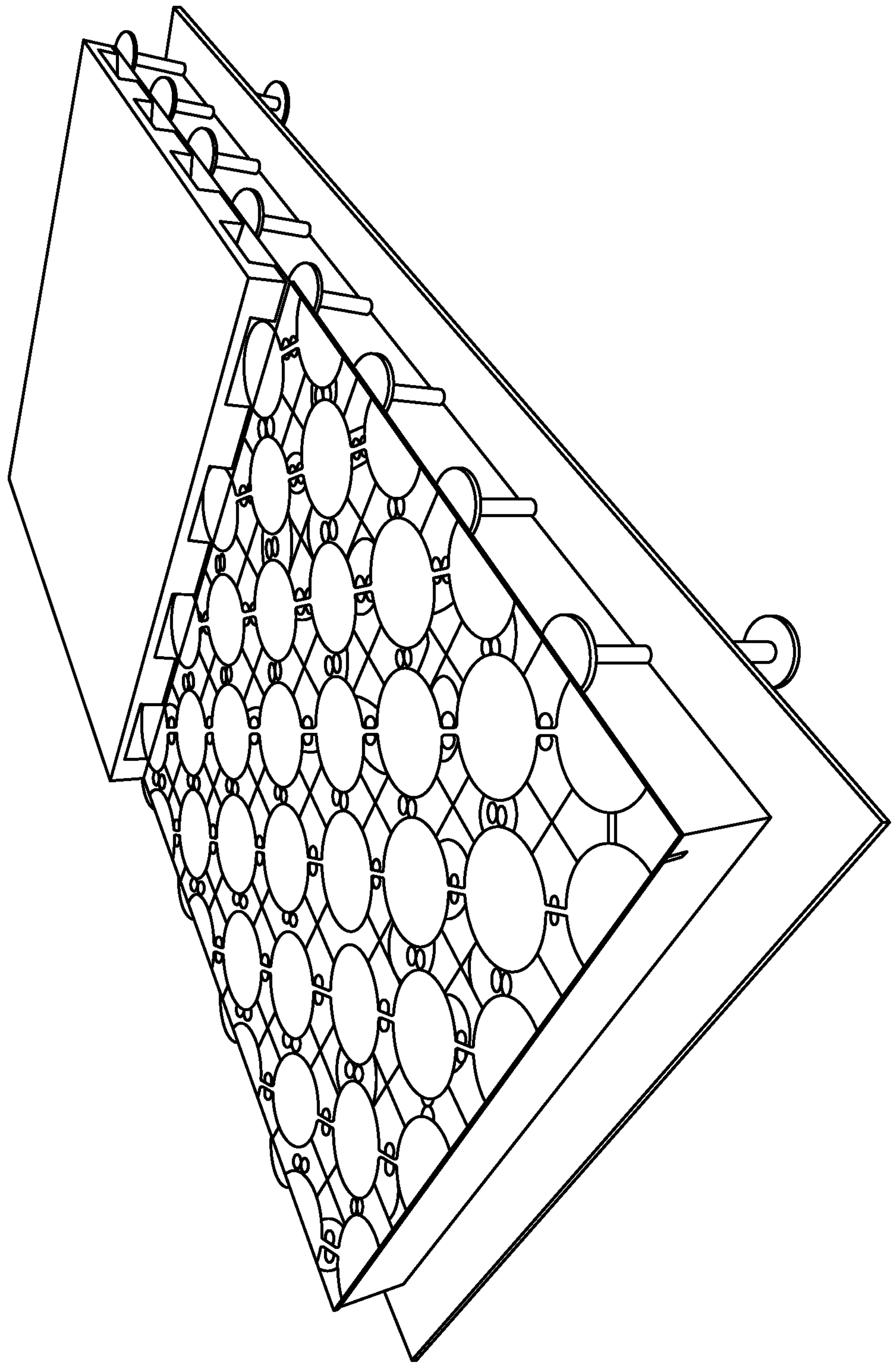

FIG. 8A and FIG. 8B show the PUMA array structure in accordance of the present disclosure. This figure shows a complete PUMA assembly, including feeds and coax connectors. This arrangement allows connection to other components of the radio assembly including the point where the coaxial feed structure is connected to the PUMA array 27, the copper dipole layer (Dipole layer Duroid) 28, and loaded via a capacitive loading screw 29. The measurements are exemplary and are not intended to be limiting.

In a traditional UWB antenna such as a PUMA, the elements are spaced at one-half the wavelength at the highest frequency ($\lambda/2$). This is because the UWB antenna traditionally phase-combines multiple elements to create a phased array of antennas. In one configuration, the antenna is using one (or a small number of) feed element(s) to drive a single beam of energy. The UWB antenna comprising the modified Luneburg lens, including discretized modified Luneburg lens described herein, differs from the existing instantiations, at least, as follows:

The element location is dictated not by phased array formulas but instead by the location of the beams. Because of this, the elements will not necessarily be spaced at $\lambda/2$, and elements will not necessarily be evenly spaced, but instead match the appropriate mapping of the modified Luneburg lens to cover a cell of area that translates to a specific direction out of the lens. In the traditional UWB antenna, adjacent elements interact with one another and this interaction is integral to the operation of the UWB antenna in a phased array application. In the systems described herein, the elements can operate independently of adjacent elements, so the nature of the interaction between elements will be quite different.

In a traditional UWB antenna such as a PUMA, the top layer of the antenna is matched to air/free space. In this application, the UWB antenna structure will be matched to the lens via the anti-reflective layer. Because of this, the UWB antenna structure design could deviate quite significantly from the traditional UWB antennas at least as follows:

The top layer of dielectric in a UWB antenna design is integrated into the anti-reflective layer, or it will be replaced entirely by the anti-reflective layer. There will exist a single layer of material between the dipole layers of the UWB antenna and the modified Luneburg lens. This layer will be designed to provide good matching between the UWB antenna and the modified Luneburg lens.

A continuous modified Luneburg lens may have a planar anti-reflective layer coupled to the top of the lens and the bottom of the lens. A discretized modified Luneburg lens may have a planar anti-reflective layer coupled to the top of the lens and the bottom of the lens.

Because the lens and the anti-reflective layer may not be homogenous across the interface surface, it is possible that, in addition to being spaced differently, the UWB antenna elements may have different designs at different points across the surface. The design criteria for the antenna is to have well-behaved gain both spatially and across frequency. Having the ability to optimize the design of the lens, the anti-reflective layer, and the individual feed elements maximizes the efficiency and bandwidth of this invention.

Figure 9:
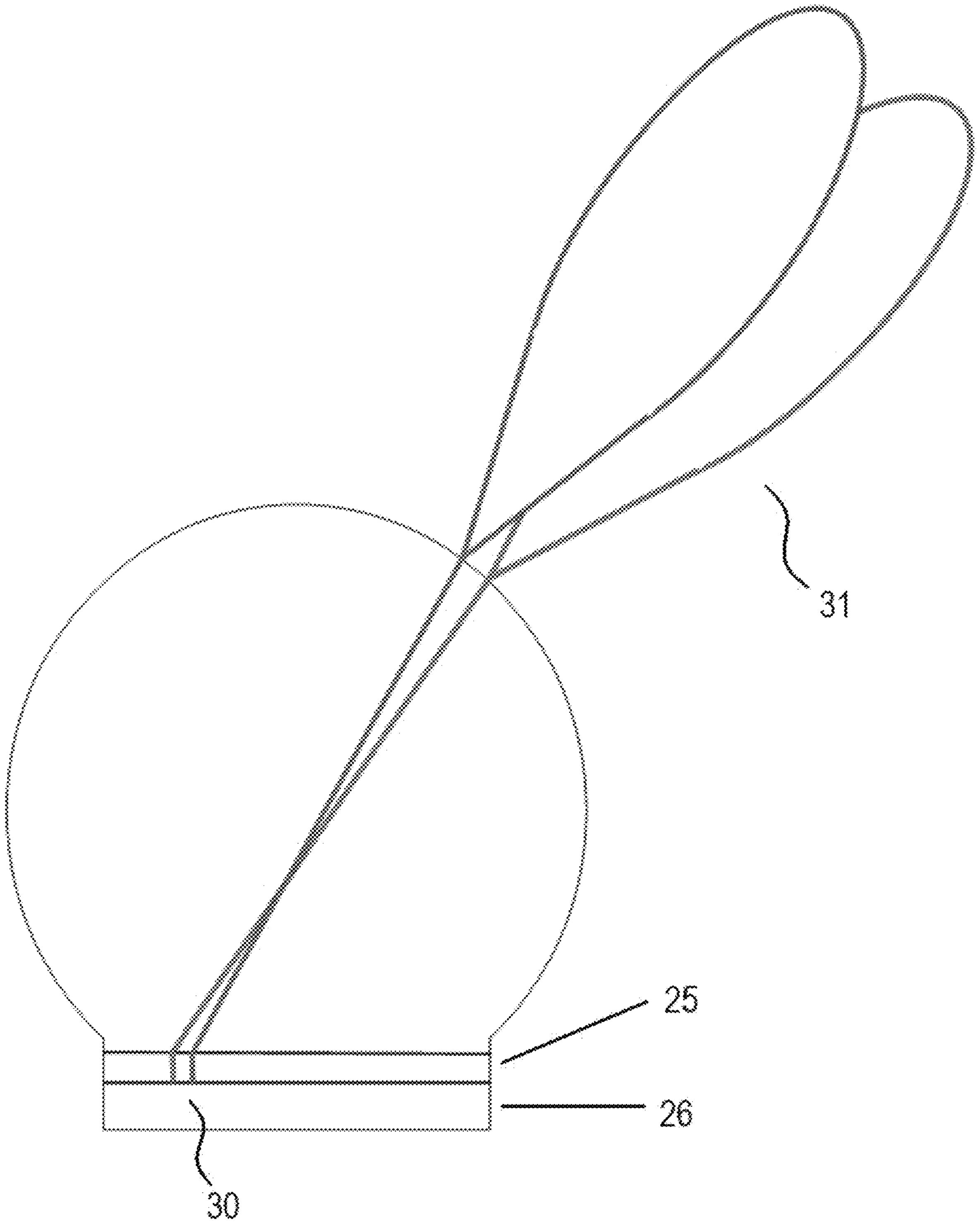
FIG. 9 depicts adjacent feeds servicing adjacent beams, in accordance with the present disclosure.

An element of this design is that the UWB antenna array does not function as a phased array. Rather, individual elements of the UWB antenna function as individual feeds for individual beams aimed in separate directions through the lens. In FIG. 9, the relationship between the adjacent feeds 30 and the adjacent beams 31 is shown. The Luneburg lens, including discretized Luneburg lens, are coupled to an Anti-reflective layer 25 which is in turn is electrically coupled to a PUMA feed 26.

The lens and feed are designed in such a way that adjacent feeds will correspond to adjacent antenna beams. Assuming all elements are spaced correctly, the beams will overlap in such a way as to allow simultaneous illumination of an entire field of regard, in this case a field of roughly 60 degrees semi-hemispherical from boresite. By providing an RF matrix switch in the system that connects to all of the beam ports a number (n) of the ports can be illuminated simultaneously.

As an example, a 25-cm. (10-in.) antenna has a beamwidth on the order of 3 dB at 30 GHz. For the coverage of +/−45 degrees, a total of approximately 675 beams and feeds are required. This is a circular array of UWB antenna feeds approximately 30 elements across. If the feed surface also has a diameter of 25-cm., the feeds are spaced on the order of 1-cm apart. The intersection of the adjacent scanned beams can be designed to be 1 dB to 3 dB below peak gain value. Also, the intersection of the adjacent scanned beams can be designed to allow for a sectored approach to the antenna, similar to a cellular network or a stationary radar aperture. Also, the anti-reflective layer may be homogeneous across the entire surface creating an equal match across the entire connection between the PUMA and Modified Luneburg Lens devices. Also, the anti-reflective layer may not be homogeneous across the entire surface in order to increase both the gain and directivity of the system. Also, the PUMA elements may be redesigned to be spaced differently in order to smooth the gain and directivity of the system across the entirety of coverage area. Also, the PUMA, the anti-reflective layer, and the Modified Luneburg Lens may be constructed using a single additive manufacturing process. In this embodiment, the entire structure would be printed in layers inside a single additive manufacturing machine, allowing for a low-cost approach to the production of the system. These objectives are accomplished by the various aspects of the invention that uses multiple existing inventions in unique and novel ways to create an entire new field of antenna technologies.

Also, the device may include a switching network in order to connect any single port of the PUMA array to a transmit/receive radio frequency chain up to and including the modulator/demodulator (MODEM).

Also, the device may include one or a plurality of physical feed connections that are mechanically controlled to connect to each individual port of the PUMA array, allowing for the total device to connect any single port of the PUMA to a transmit/receive radio frequency chain up to and including the modulator/demodulator (MODEM). In this embodiment, the physical feed is mechanically guided by an X-Y plotter-style apparatus that can position the feed at any single PUMA port through mechanically changing the position in both the X and Y planes, similar to how an XY Plotter would work.

The Anti-reflective layer device between the PUMA and Modified Luneburg Lens, including discretized Luneburg lens, is a layer of material with specific dielectric constants at specific locations within the device that create the broadband match between the PUMA and the Modified Luneburg Lens. The Anti-reflective layer may be manufactured using an additive manufacturing method at the same time the Luneburg Lens is manufactured (using a 3D printer with DFM technique).

In an embodiment, an ultra-wideband array antenna such as the Planar Ultrawideband Modular Array (PUMA) is connected to a Luneburg Lens, including a discretized Luneburg lens, that has been modified using Transformational Optics (TO) to flatten a portion of the lower hemisphere of the typically spherical lens. In an embodiment, the ultrawideband antenna (such as a PUMA) structure is used as a feed network for the described device.

Figure 10A:
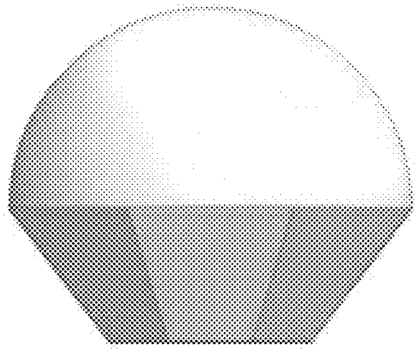
FIG. 10A depicts one of several geometries that is configured to interface multiple PUMA array panes to the Luneburg lens, in accordance of the present disclosure.
Figure 10B:
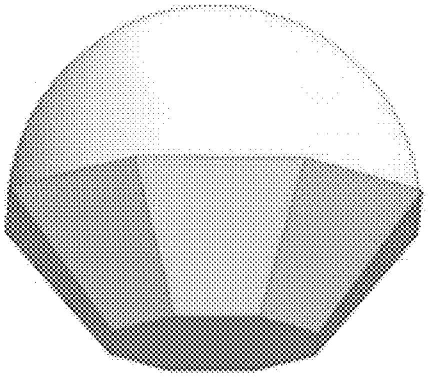
FIG. 10B is tilted view of the embodiment of FIG. 10A.
Figure 11A:
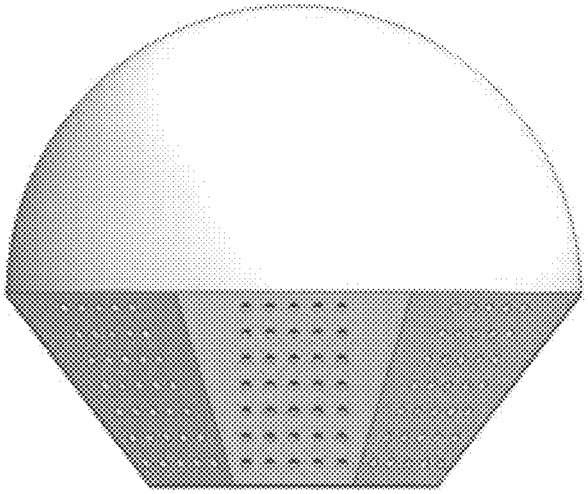
FIG. 11A depicts FIG. 10A with a PUMA array attached.
Figure 11B:
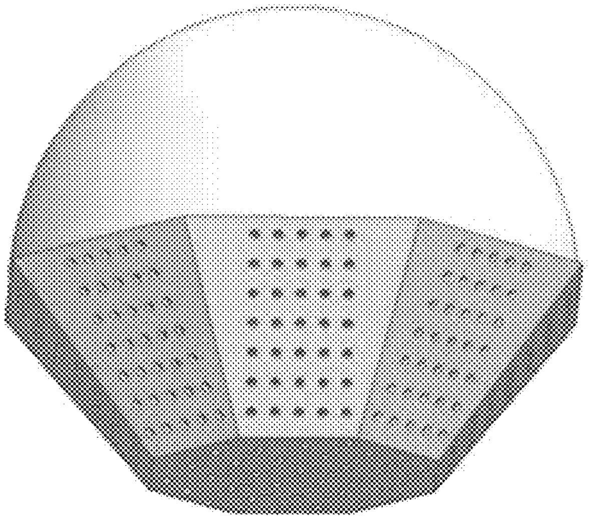
FIG. 11B depicts FIG. 10B with a PUMA array attached.

In another embodiment, multiple ultra-wideband array such as the PUMA are connected to multiple flattened surfaces of the Luneburg lens, as shown in FIG. 10A and FIG. 10B. The PUMAs connected at several angles allow for full hemispherical coverage of the sky. FIG. 11A and FIG. 11B illustrate the PUMAs connected to the Luneburg lens.

Figure 7:
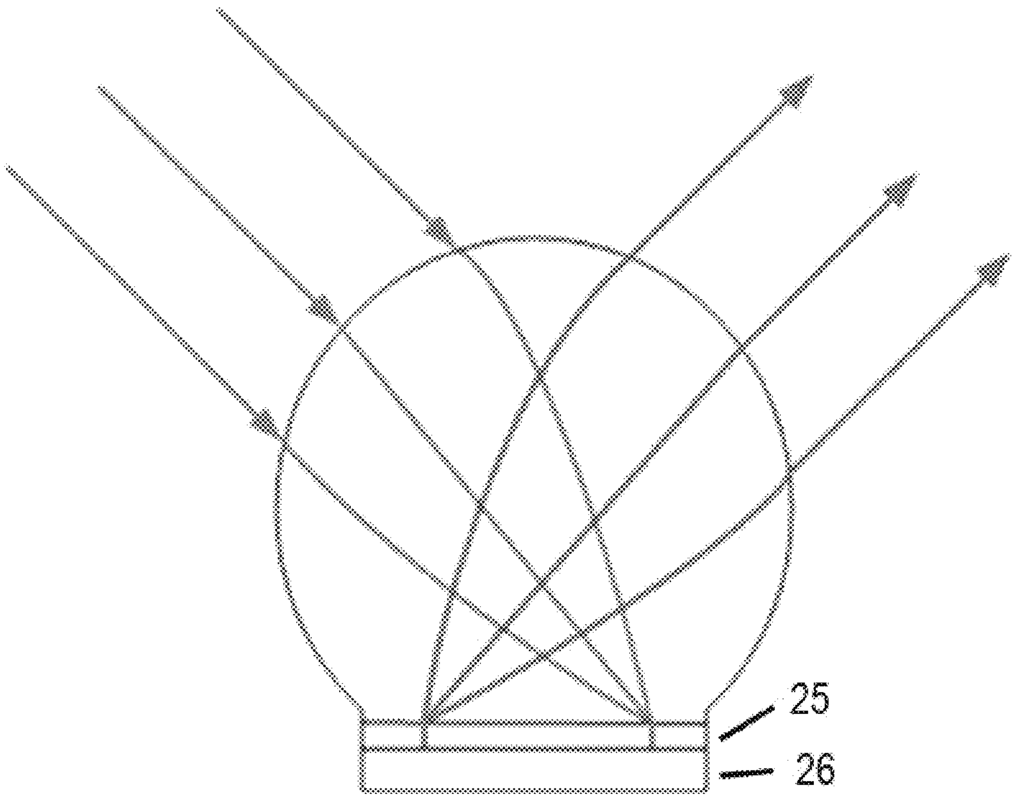
FIG. 7 depicts one embodiment of the present invention, in accordance with the present disclosure.

As depicted in FIG. 7, the modified Luneburg Lens can only cover approximately +/−50 degrees of beamwidth. An anti-reflective layer 25 is coupled to the bottom of the modified Luneburg lens, including discrete Luneburg lens, which is, in turn, coupled to a PUMA feed 26.

Referenced to the 'top' of the antenna when it is oriented vertically. Said another way, when oriented vertically, the Modified Luneburg can only 'see' targets that are above 40 degrees in elevation. This limitation is similar to flat phased array antennas, which see a significant gain roll-off below about 45 degrees of elevation.

To solve this problem, instead of a single flat feed surface, multiple flat feed surfaces to illuminate different sectors of the lens is utilized. As depicted in FIG. 11A and FIG. 11B, the bottom feed is connected to a planar interface at the bottom and illuminates the top of the antenna. The feeds are connected to multiple geometrically designed interfaces at the side and illuminate the lower elevations. The antenna can have similar gains close to (or perhaps eventually even below) 0 degree elevation. Therefore, the antenna has a higher field of view and a full hemispherical coverage of the sky. Since each feed is independent and illuminates a different portion of the sky, with the right RF, switching, and modem structure, many beams and connections can be supported simultaneously.

The following table provides an estimate for the gain and the number of feeds needed for different size lenses.

| | | Ka (30 GHz) | |
|---|---|---|---|
| Diameter[m] | Diameter (inches) | G[dBi] | # of feeds |
| 0.15 | 5.85 | 30 | 600 |
| 0.25 | 9.75 | 35 | 2200 |
| 0.35 | 19.5 | 39 | 8800 |

This embodiment has the three following attributes: (1) Wideband—The lens is inherently wideband. Therefore, the bandwidth of the system is dictated by the RF and electronics used to drive the antenna; (2) Multi-beam. Since each beam/feed is independent of the rest, the number of beams supported is determined by the switching scheme and the number of modems employed. Nothing precludes the possibility of multiple connections within a single beam as long as the two connections are at different frequencies and (3) Wide area of coverage. With the enhanced Luneburg Approach, the limitation of +/−50 degrees of coverage is eliminated. The addition of multiple faces to illuminate different sectors of the lens leads to a lens that can provide full hemispherical coverage. This feature allows the antenna to be able to access low look angle satellites (close to the horizon), but it also allows the antenna to also be used for terrestrial (cell tower) communications. This means that this antenna is suitable to switch between satellite communications and tower-based (IE 5G) communications.

Example 1

Comparison of Additive Manufacturing Versus Discretized Approach

Additive manufacturing (also known as "3D printing") is used to manufacture Luneburg lenses. On the computational side, the emergence of transformational optics (TO), coupled with high powered computers capable of solving massive computational problems, have opened up the possibility of designing much more complicated, non-uniform modified lens antennas. On the manufacturing side, 3D printing has become mature enough to allow the printing of RF structures. In one method, air and printing material are inter-mixed in different ratios in periodic structures to create a lens with constantly varying dielectric. The merging of TO with 3D printing has following problems prevent it from being viable for making production lenses.

However, the 3D Printing approach has limitations. For example, a $400,000 USD machine is required for each antenna in process. It requires 6 weeks of continuous machine time per antenna to achieve the required position for making a 10-inch antenna. Generally, there is an upper limit on the order of 16 inches on size for a lens using 3D printing. If there is a glitch during the manufacturing process, the whole antenna may need to be scrapped. These are severe problems from a commercialization standpoint.

In contrast, the inventors modified the transformational optics design process to work with a discretized structure, therefore enabling a modified Luneburg lens to be manufactured using the layered manufacturing process. In particular, this improved manufacturing processing allows a modified Luneburg lens to be commercialized. Using the discretized methods described herein, the only tooling required are molds for the layers. The manufacturing time is about 8 hours for 10 antennas using the manufacturing methods described herein. The upper limit on size exceeds 1 meter using the manufacturing methods described herein. There is a near term operational need for antennas approaching one meter in diameter, and even larger antennas could be sold if they could be produced. An antenna made using the method used herein is much more rugged than a 3D printed antenna. The realizable dielectric constant can be much higher (dielectric constant >15), enabling a wider range of designs and performance.

In summary, the discretized methods described herein are already viable for making rugged antennas in reasonable quantities at a reasonable price, and with time the price is likely to decrease.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in electrical engineering, telecommunications, computer science, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

We claim:

1. A high-gain, wide-angle, multi-beam, multi-frequency beamforming lens antenna system comprising:

a Luneburg lens with at least one planar interface in a southern hemisphere of the Luneburg lens; and at least one planar ultrawideband modular array (PUMA array) structure is operatively coupled to the planar interface, wherein the PUMA array structure is configured to function as a feed network to illuminate at least one or more beams of the Luneburg lens simultaneously;

wherein the antenna is communicably coupled between multiple networks operating at different frequencies.

2. The antenna of claim 1, wherein the PUMA array structure is matched to the Luneburg lens to form a single layer of material between dipole layers of the PUMA array structure and the Luneburg lens.

3. The antenna of claim 1, wherein feed elements of the PUMA array structure are spaced unevenly.

4. The antenna of claim 3, wherein each feed element of the feed elements operates independently of adjacent elements.

5. The antenna of claim 1, wherein an illumination in a direction is at least increased or decreased via adjusting a positioning of the planar interface.

6. The antenna of claim 1, wherein the Luneburg lens is discretized into multiple dielectric layers and each layer has a discrete dielectric constant.

7. The antenna of claim 1, wherein the dielectric layers are cast individually, nested together, and assembled using an adhesive.

8. The antenna of claim 1, wherein the Luneburg lens comprises polyoxymethylene POM, polycarbonate resin thermoplastic, or a combination thereof.

* * * * *